United States Patent
Shi et al.

(10) Patent No.: US 12,245,208 B2
(45) Date of Patent: Mar. 4, 2025

(54) METHODS AND DEVICES FOR CONFIGURING TIME DOMAIN RESOURCE ALLOCATION

(71) Applicant: ZTE Corporation, Shenzhen (CN)

(72) Inventors: Jing Shi, Shenzhen (CN); Peng Hao, Shenzhen (CN); Xianghui Han, Shenzhen (CN); Min Ren, Shenzhen (CN); Shuaihua Kou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 304 days.

(21) Appl. No.: 17/867,919

(22) Filed: Jul. 19, 2022

(65) Prior Publication Data

US 2023/0007651 A1    Jan. 5, 2023

Related U.S. Application Data

(63) Continuation of application No. PCT/CN2020/074881, filed on Feb. 12, 2020.

(51) Int. Cl.
*H04W 72/0446*    (2023.01)
(52) U.S. Cl.
CPC .............................. *H04W 72/0446* (2013.01)
(58) Field of Classification Search
CPC ................................................ H04W 72/0446
See application file for complete search history.

(56) References Cited

U.S. PATENT DOCUMENTS

| | | | |
|---|---|---|---|
| 2019/0394075 A1 | 12/2019 | Baldemair et al. | |
| 2022/0167352 A1* | 5/2022 | Bhamri | ................. H04L 5/0053 |

FOREIGN PATENT DOCUMENTS

| | | | | |
|---|---|---|---|---|
| CN | 110167160 A | 8/2019 | | |
| CN | 110351837 A | 10/2019 | | |
| CN | 110536448 A | 12/2019 | | |
| CN | 110720248 A | 1/2020 | | |
| EP | 3780839 A1 * | 2/2021 | ........... | H04L 5/0053 |
| WO | WO 2019098931 A1 | 5/2019 | | |
| WO | WO2019214708 A1 | 11/2019 | | |
| WO | WO2019246451 A1 | 12/2019 | | |
| WO | WO2020027587 A1 | 2/2020 | | |

OTHER PUBLICATIONS

Extended European Search Report regarding EP 20 88 7445 dated Dec. 12, 2022, 13 pages.

(Continued)

*Primary Examiner* — Michael Thier
*Assistant Examiner* — Tracy Lauren Colbert
(74) *Attorney, Agent, or Firm* — Crowell & Moring LLP

(57) ABSTRACT

Method, systems and devices for configuring time domain resource allocation (TDRA) of a physical uplink shared channel (PUSCH) for a user equipment. The method includes receiving, by the user equipment, a radio resource control (RRC), the RRC configuring a TDRA type corresponding to a TDRA table. Another method includes sending, by a network base station, a RRC configuring a TDRA type corresponding to a TDRA table for the user equipment.

16 Claims, 7 Drawing Sheets

(56) References Cited

OTHER PUBLICATIONS

Nokia et al., "Summary #1 of PUSCH enhancements for NR eURLLC (AI7.2.6.3)," 3GPP Draft; R1-1913242, 3$^{rd}$ Generation Partnership Project (3GPP), Mobile Competence Centre ; 650, Route Des Lucioles, F-06921 Sophia-Antipolis Cedex, France, RAN WG1, Reno, NV, USA; Nov. 19, 2019, XP051826609.

ZTE, "Pusch enhancements for NR URLLC," 3GPP Draft; R1-1911965, 3rd Generation Partnership Project (3GPP), Mobile Competence Centre, 650, Route Des Lucioles ; F-06921 Sophia-Antipolis Cedex, France, RAN WG1, Reno, USA; Nov. 9, 2019, pp. 1-10, XP051823146.

Nokia et al., "On PUSCH enhancements for NR URLLC," 3GPP Draft; R1-1912513, 3rd Generation Partnership Project (3GPP), Mobile Competence Centre, 650, Route Des Lucioles, F-06921 Sophia-Antipolis Cedex, France, RAN WG1, Reno, NV, USA, Nov. 22, 2019, Nov. 9, 2019, XP051823453.

"3rd Generation Partnership Project; Technical Specification Group Radio Access Network; NR; Physical layer procedures for data (Release 16)," 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, RAN WG1, V16.0.0, Jan. 14, 2020, pp. 1-147, XP051860777.

International Search Report and Written Opinion regarding PCT/CN2020/074881 dated Nov. 17, 2020, 6 pages.

Huawei et al. "Enhanced UL configured grant transmission," *3GPP TSG RAN WGJ Meeting #99 RI-1911895*, Nov. 22, 2019, 4 pages.

Indian Patent Office First Examination Report regarding 202217036367 dated Dec. 8, 2022.

Chinese Office Action with English translation of the Office Action regarding 202080085316.9 dated Sep. 27, 2024, 9 pages.

Intel Corporation, "R1-1906808 On PUSCH enhancements for eURLLC," 3GPP tsg_ran\wg1_rl1, dated May 13-17, 2019, 9 pages.

Korean Office Action with machine translation regarding 10-2022-7019329 dated Jan. 14, 2025, 11 pages.

Nokia et al., R1-1913242, "The Summary #1 of PUSCH enhancements for NR eURLLC (AI 7.2.6.3)," dated Nov. 19, 2019, 3GPP TSG RAN WG1 Meeting #99, 3GPP server publication, 40 pages.

3GPP TS 38.214 V16.0.0 (Dec. 2019), 3rd Generation Partnership Project, Technical Specification Group Radio Access Network, NR, Physical layer procedures for data, (Release 16), dated Dec. 2019, 147 pages.

\* cited by examiner

400 receiving, by the user equipment, a radio resource control (RRC), the RRC configuring a TDRA type corresponding to a TDRA table
410

FIG. 4A receiving, by the user equipment, a downlink control information (DCI) from the network base station, the DCI including an index corresponding to an entry index in the TDRA table.
420 configuring, by the user equipment, the TDRA of PUSCH based on the entry in the TDRA table
430

FIG. 4B

| TDRA index | K2 | S,L | Mapping type | Repetition number |
|---|---|---|---|---|
| 0 | 2 | S=0, L=7 | B | 1 |
| 1 | 1 | S=0, L=2 | B | 4 |
| 2 | 0 | S=10, L=4 | B | 4 |
| 3 | 1 | S=0, L=4 | B | 8 |
| ... | | | | |

FIG. 5

| TDRA index | K2 | SLIV or S,L | Mapping type |
|---|---|---|---|
| 0 | 2 | S{0,0,0,0} L{14,14,14,14} | {A,A,A,A} |
| 1 | 1 | S{7,0,7,0} L{7,7,7,7} | {B,A,B,A} |
| 2 | 0 | S=10, L=4 | B |
| 3 | 1 | S=0, L=14 | A |
| ... | | | |

| TDRA index | K2 | SLIV or S,L | Mapping type |
|---|---|---|---|
| 0 | 2 | S=0, L=14 | A |
| 1 | 1 | S=0, L=7 | A |
| 2 | 0 | S=10, L=4 | B |
| 3 | 1 | S=7, L=7 | B |
| ... | | | |

FIG. 8

| TDRA index | K2 | SLIV or S,L | Mapping type | Repetition number |
|---|---|---|---|---|
| 0 | 2 | S{0,0,0,0} L{14,14,14,14} | {A,A,A,A} | 1 |
| 1 | 1 | S{7,0,7,0} L{7,7,7,7} | {B,A,B,A} | 1 |
| 2 | 1 | S=2, L=7 | B | 1 |
| 3 | 2 | S=4, L=4 | B | 4 |
| 4 | 1 | S=0, L=4 | B | 8 |
| ... | | | | |

FIG. 9

| TDRA index | K2 | SLIV or S,L | Mapping type | Repetition number |
|---|---|---|---|---|
| 0 | 2 | S=0, L=14 | A | 1 |
| 1 | 1 | S{7,0,7,0} L{7,7,7,7} | {B,A,B,A} | 1 |
| 2 | 2 | S=4, L=4 | B | 4 |
| 3 | 1 | S{7,0,7,0} L{7,7,7,7} | {B,B} | 2 |
| 4 | 1 | S{7,0,7,0} L{7,7,7,7} | {B,B,B,B} | 2 |
| ... | | | | |

FIG. 10

| TDRA index | K2 | SLIV or S,L | Mapping type |
|---|---|---|---|
| 0 | 2 | S{0,0,0,0} L{14,14,14,14} | {A,A,A,A} |
| 1 | 1 | S{7,0,7,0} L{6,6,6,6} | {B,A,B,A} |
| 2 | 0 | S=10, L=4 | B |
| 3 | 1 | S=0, L=14 | A |
| ... | | | |

METHODS AND DEVICES FOR CONFIGURING TIME DOMAIN RESOURCE ALLOCATION

CROSS-REFERENCE TO RELATED APPLICATION

This application is a continuation application of PCT International Patent Application No. PCT/CN2020/074881, filed with the China National Intellectual Property Administration, PRC on Feb. 12, 2020, which is herein incorporated by reference in its entirety.

TECHNICAL FIELD

The present disclosure is directed generally to wireless communications. Particularly, the present disclosure relates to methods and devices for configuring time domain resource allocation (TDRA).

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide a fast response with low latency communication between user equipment and wireless access network nodes. URLLC may be supported on a licensed frequency carrier. There are some issues with configuring time domain resource allocation (TDRA) associated with URLLC on a licensed and/or non-licensed frequency carrier. The present disclosure may address at least some of issues associated with the existing system to improve the performance of the wireless communication.

SUMMARY

This document relates to methods, systems, and devices for wireless communication, and more specifically, for configuring time domain resource allocation (TDRA).

In one embodiment, the present disclosure describes a method for wireless communication. The method includes receiving, by a user equipment, a radio resource control (RRC). The RRC configures a time domain resource allocation (TDRA) type corresponding to a TDRA table of a channel.

In another embodiment, the present disclosure describes a method for wireless communication. The method includes sending, by a network base station, a radio resource control (RRC). The RRC configures a time domain resource allocation (TDRA) type corresponding to a TDRA table of a channel.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS [CAN BE CENTERED]

FIG. 4A shows a flow diagram of a method for wireless communication.

FIG. 4B shows a flow diagram of optional steps for the method in FIG. 4A.

FIG. 5 shows an exemplary embodiment of a time domain resource allocation (TDRA) table.

FIG. 6 shows another exemplary embodiment of a TDRA table.

FIG. 7 shows another exemplary embodiment of a TDRA table.

FIG. 8 shows another exemplary embodiment of a TDRA table.

FIG. 9 shows another exemplary embodiment of a TDRA table.

FIG. 10 shows another exemplary embodiment of a TDRA table.

DETAILED DESCRIPTION [CAN BE CENTERED]

Figure 1:
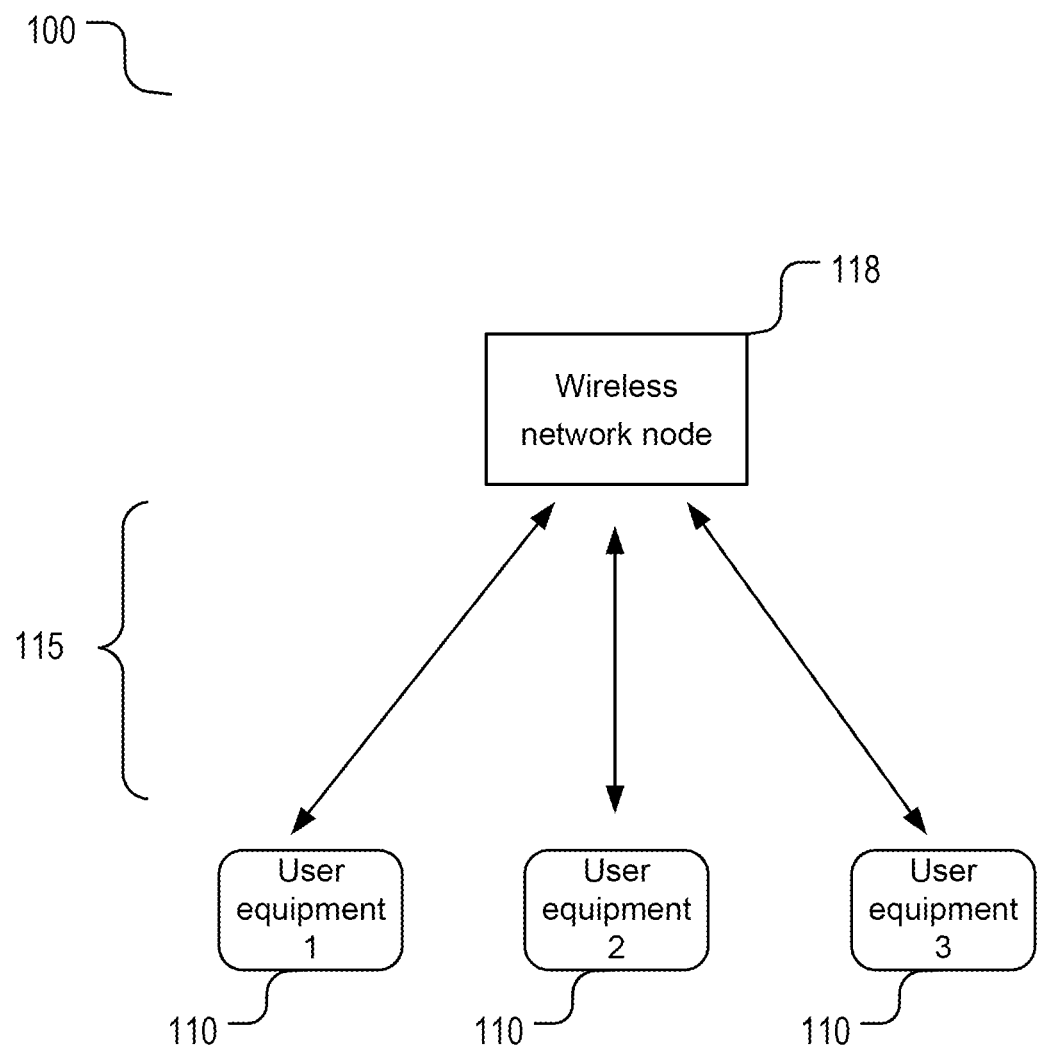
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for configuring time domain resource allocation (TDRA).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide a fast response with low latency communication between user equipment and a wireless access network node. To increase bandwidth, shorten latency, and/or improve speed, the wireless communication may be carried on licensed frequency bands and/or new radio unlicensed (NR-U) frequency bands.

In the 5th generation (5G) communication system, a URLLC dynamic grant (DG) physical uplink shared channel (PUSCH) may have different transmission schemes from a NR-U DG PUSCH. In the URLLC DG PUSCH, a single transport block (TB) may be repeated a number of repetition times; and the number of repetition times (can be also described as repetition number) may be indicated dynamically. The TDRA of the URLLC DG PUSCH may be configured to include a parameter indicating the repetition number. The NR-U DG PUSCH may support data transmission over one or more transmission time intervals (TTIs) and each TTI is used to transport different TB. The TDRA of the NR-U DG PUSCH may be configured to include one or more start and length indicator values (SLIVs).

The present disclosure describes methods and devices for configuring time domain resource allocation (TDRA) to transmit DG PUSCH when URLLC operates in an unlicensed frequency band. The present disclosure may provide methods so that the configuration to transmit DG PUSCH has high flexibility, and supports dynamic configuration of repetition, multiple scheduling gaps, and/or a combination of herein. The present disclosure addresses at least some issues associated with URLLC working on unlicensed frequency bands so as to improve reliability, increase transmission chances, and enhance the scheduling flexibility of using non-licensed frequency bands for URLLC transmission.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send a radio resource control (RRC) to the user equipment 110, so that the RRC may include information to configure a TDRA type corresponding to a TDRA table.

Figure 2:
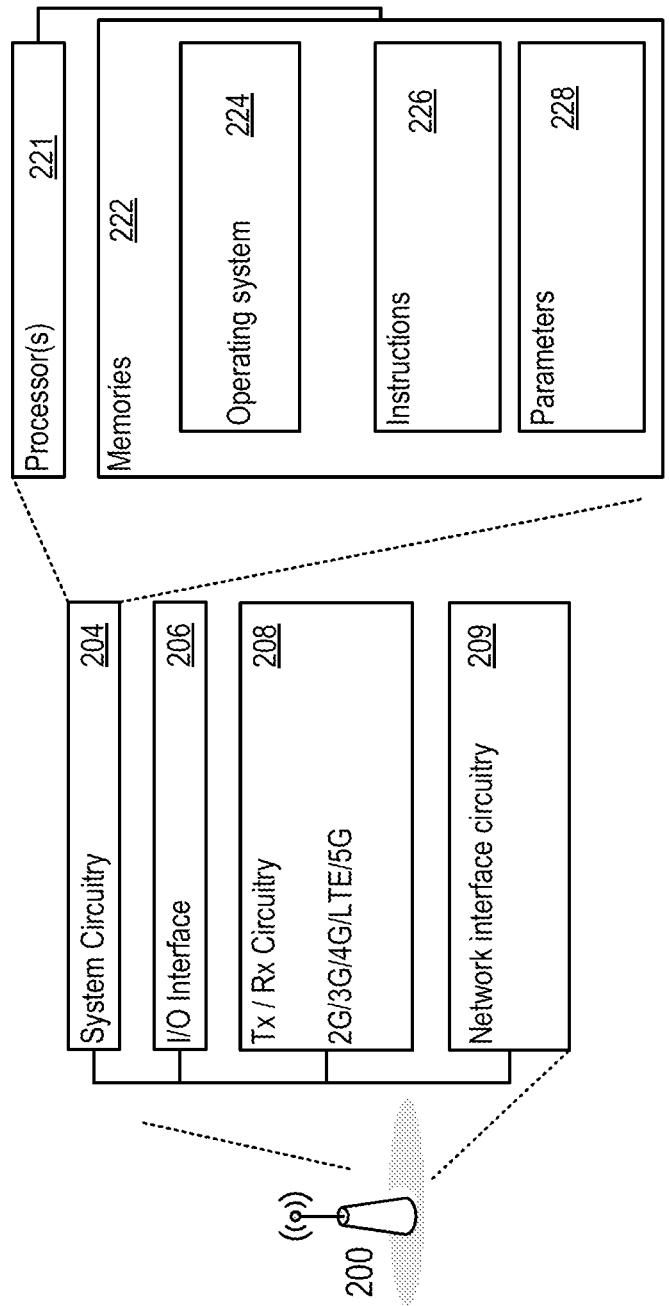
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
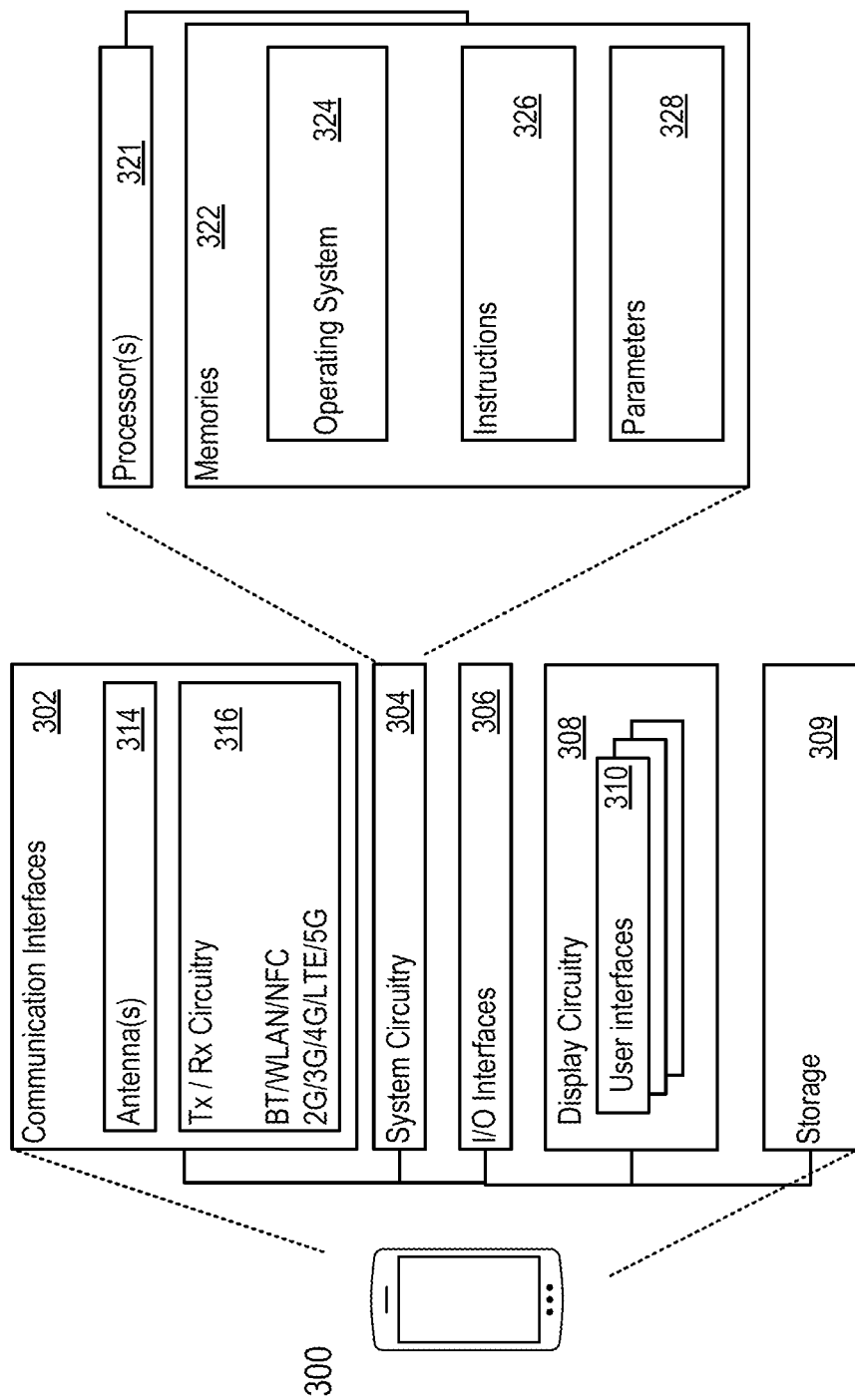
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above.

Referring to FIG. 4A, the present disclosure describes embodiments of a method 400 for configuring time domain resource allocation (TDRA) of a physical uplink shared channel (PUSCH) for a user equipment. The method 400 may include step 410: receiving, by the user equipment, a radio resource control (RRC), the RRC configuring a TDRA type corresponding to a TDRA table. The RRC may be sent by a network base station (for example, a gNB) to the user equipment. There may be a set of TDRA types, and each TDRA type may be configured based on a corresponding TDRA table.

In some embodiments, the set of TDRA types may be a set X, and the set X may include {type I RRC, type II RRC, type III RRC}. A TDRA table may correspond to each type in the set X. In one implementation, the type I RRC may refer to a URLLC mode and the corresponding TDRA table include a column of repetition numbers; the type II RRC may refer to a new radio-unlicensed (NR-U) mode and the corresponding TDRA table include one or more pairs of start and length indicators; and the type III RRC may refer to a NR traditional mode.

Referring to FIG. 5, a TDRA table 500 may be configured according to the type I RRC. In one implementation, the RRC received by the user equipment may include a format of PUSCH-TimeDomainResourceAllocationList-ForDCIformat0_2. In another implementation, the RRC received by the user equipment may include a format of PUSCH-TimeDomainResourceAllocationList-ForDCIformat0_1.

The TDRA table 500 may include a plurality of entries 510. A number of entries 510 in the TDRA table 500 is up to 64. For example, when the TDRA index is represented by a 4-bit value, the number of entries may be 16; and when the TDRA index is represented by a 6-bit value, the number of entries may be 64.

The TDRA table 500 may include a plurality of columns, including a TDRA index 550, a K2 552, a pair of start and length values (S, L) 554, a mapping type 556, and a repetition number 558.

The TDRA index 550 may indicate an index of each entry in the TDRA table 500, and the TDRA index may include a range of beginning at 0 and ending at (N−1), where N is the number of entries in the TDRA table 500. Optionally, in one implementation, the TDRA index may be specified by the network base station. Referring to FIG. 4B, the method 400 may further include step 420: receiving, by the user equipment, a downlink control information (DCI) from the network base station. The DCI may include an index corresponding to an entry index in the TDRA table. The method 400 may further include step 430: configuring, by the user equipment, the TDRA of PUSCH based on the entry in the TDRA table.

The K2 552 may a slot or sub-slot number configured for a physical uplink shared channel (PUSCH) after a corresponding uplink (UL) grant, indicating a scheduling timing between the UL grant and the PUSCH.

The pair of start and length values (S, L) 554 may indicate a starting symbol (S) in the slot indicated by the K2 552 of the transport block (TB) and a length (L) of symbols. In another implementation, the column 554 may include a pair of start and length indicators, including an S indicator and an L indicator respectively.

The mapping type 556 only include a mapping type B.

The repetition number 558 may indicate a number of times repeating the TB specified by the pair of start and length values in 554. For example, for the entry 512 with the TDRA index as 1, the TDRA may include the repeating of a TB on 0-1, 2-3, 3-4, and 4-5 symbols in the first slot after the corresponding UL grant with the mapping type B.

Referring to FIG. 6, a TDRA table may be configured according to the type II RRC, supporting one or more TTIs. In one implementation, the RRC received by the user equipment may include a format of PUSCH-TimeDomainAllocationList-r16.

The TDRA table 600 may include a plurality of entries 610. A number of entries 610 in the TDRA table 600 is up to 16. For example, when the TDRA index is represented by a 2-bit value, the number of entries may be 4; and when the TDRA index is represented by a 4-bit value, the number of entries may be 16.

The TDRA table 600 may include a plurality of columns, including a TDRA index 650, a K2 652, at least one pair of start and length values (S, L) 654, and at least one mapping type 656. The mapping type in 656 may include a mapping type A and/or a mapping type B. In one implementation, a pair number of the at least one pair of start and length values is equal to a number of the at least one mapping type.

The TDRA index 650 may indicate an index of an entry in the TDRA table 600, and the TDRA index may include a range of beginning at 0 and ending at (N−1), where N is the number of entries in the TDRA table 600. Optionally, in one implementation, the TDRA index may be specified in the DCI sent from the network base station and the TDRA of PUSCH is configured based on the specified entry in the TDRA table, as shown in FIG. 4B. For example, for the entry 612 with the TDRA index as 1, the TDRA may include TB1 on 7-13 symbols of the first slot after the corresponding UL grant with the mapping type B, TB2 on 0-6 symbols of the second slot after the corresponding UL grant with the mapping type A, TB3 on 7-13 symbols of the second slot after the corresponding UL grant with the mapping type B, and TB4 on 0-6 symbols of the third slot after the corresponding UL grant with the mapping type A. TB1, TB2, TB3, and TB4 may be different TBs. For another example, for the entry 614 with the TDRA index as 3, the TDRA may include a TB on 0-13 symbols of the first slot after the corresponding UL grant with the mapping type A.

Referring to FIG. 7, a TDRA table 700 may be configured according to the type III RRC. In one implementation, the RRC received by the user equipment may include a format of PUSCH-TimeDomainAllocationList. In another implementation, a PUSCH transmission mode according to type III RRC may indicate a new radio (NR) traditional mode.

The TDRA table 700 may include a plurality of entries 710. A number of entries 710 in the TDRA table 700 is up to 16. For example, when the TDRA index is represented by a 2-bit value, the number of entries may be 4; and when the TDRA index is represented by a 4-bit value, the number of entries may be 16.

The TDRA table 700 may include a plurality of columns, including a TDRA index 750, a K2 752, a pair of start and length values 754, and a mapping type 756. The mapping type in 756 may include a mapping type A or a mapping type B.

The TDRA index 750 may indicate an index of an entry in the TDRA table 700, and the TDRA index may include a range of beginning at 0 and ending at (N−1), where N is the number of entries in the TDRA table 700. Optionally, in one implementation, the TDRA index may be specified in the DCI sent from the network base station and the TDRA of PUSCH is configured based on the specified entry in the TDRA table, as shown in FIG. 4B. For example, for the entry 712 with the TDRA index as 1, the TDRA may include a TB on 0-6 symbols of the first slot after the corresponding UL grant with the mapping type A. For another example, for the entry 714 with the TDRA index as 3, the TDRA may include a TB on 7-13 symbols of the first slot after the corresponding UL grant with the mapping type B.

Referring to FIG. 8, a TDRA table 800 may be configured according to a type IV RRC. The TDRA table 800 may include a plurality of entries 810. A number of entries 810 in the TDRA table 800 is up to 16 or 64. For example, when the TDRA index is represented by a 2-bit value, the number of entries may be 4; and when the TDRA index is represented by a 6-bit value, the number of entries may be 64.

The TDRA table 800 may include a plurality of columns, including a TDRA index 850, a K2 852, at least one pair of start and length (S, L) values or SLIV 854, at least one mapping type 856, and a repetition number 858. The mapping type in 856 may include a mapping type A and/or a mapping type B.

In the TDRA table 800, for any entry including a repetition number larger than one, the entry may include one pair of start and length values and one mapping type. For example, for the entry 814 with a repetition number of 4, the entry 814 includes one pair of (S, L) value and one mapping type B. For another example, for the entry 815 with a repetition number of 8, the entry 815 includes one pair of (S, L) value and one mapping type B.

In the TDRA table 800, for any entry including a repetition number equal to one, the entry may include one or more pairs of start and length values and one or more mapping types; and a pair number of start and length values may be equal to a number of the mapping types. For example, for the entry 811 with a repetition number of 1, the entry 811 includes four pair of (S, L) values and four mapping types including {A, A, A, A}. For another example, for the entry 813 with a repetition number of 1, the entry 813 includes one pair of (S, L) values and one mapping type B.

The TDRA index 850 may indicate an index of an entry in the TDRA table 800, and the TDRA index may include a range of beginning at 0 and ending at (N−1), where N is the number of entries in the TDRA table 800. Optionally, in one implementation, the TDRA index may be specified in the DCI sent from the network base station and the TDRA of PUSCH is configured based on the specified entry in the TDRA table, as shown in FIG. 4B. For example, for the entry 812 with the TDRA index of 1 and the repetition number of 1, the TDRA may include TB1 on 7-13 symbols of the first slot after the corresponding UL grant with the mapping type B, TB2 on 0-6 symbols of the second slot after the corresponding UL grant with the mapping type A, TB3 on 7-13 symbols of the second slot after the corresponding UL grant with the mapping type B, and TB4 on 0-6 symbols of the third slot after the corresponding UL grant with the mapping type A.

Optionally, in one implementation, the RRC received by the user equipment may be one of a set of X and the set X may include {type I RRC, type II RRC, type III RRC}. When the type I RRC includes PUSCH-TimeDomainResourceAllocationList-ForDCIformat0_2, a PUSCH transmission mode may be in URLLC mode with the repetition number in the configured TDRA. When the type II RRC includes pusch-TimeDomainAllocationList-r16, a PUSCH transmission mode may be in the NR-U mode with multiple TTI. When the type III RRC includes pusch-TimeDomainAllocationList, a PUSCH transmission mode may be in a traditional NR mode, which may not support dynamic repetition or multiple TTIs.

Referring to FIG. 9, a TDRA table 900 may be configured according to a type V RRC. The TDRA table 900 may include a plurality of entries 910. A number of entries 910 in the TDRA table 800 is up to 16 or 64. For example, when the TDRA index is represented by a 2-bit value, the number of entries may be 4; and when the TDRA index is represented by a 6-bit value, the number of entries may be 64.

The TDRA table 900 may include a plurality of columns, including a TDRA index 950, a K2 952, at least one pair of start and length (S, L) values or SLIV 954, at least one mapping type 956, and a repetition number 858. The mapping type in 856 may include one or more mapping type A and/or one or more mapping type B.

In the TDRA table 900, for any entry including a repetition number equal to one, the entry may include one or more pairs of start and length values and one or more mapping types; and a pair number of start and length values may be equal to a number of the mapping types. For example, for the entry 911 with a repetition number of 1, the entry 911 includes one pair of (S, L) values and one mapping type. For another example, for the entry 912 with a repetition number of 1, the entry 813 includes four pair of (S, L) values and four mapping types including {B, A, B, A}.

In the TDRA table 900, for any entry including a repetition number larger than one, the entry may include one or more pairs of start and length values and one or more mapping types. In one implementation, a pair number of start and length values may be equal to a number of the mapping types. For example, for the entry 913 with a repetition number of 4, the entry 913 includes one pair of (S, L) value and one mapping type B. In another implementation, a pair number of start and length values may be unequal to a number of the mapping types. For example, for the entry 914 with a repetition number of 2, the entry 914 includes four pair of (S, L) values and two mapping types including {B, B}.

The TDRA index 950 may indicate an index of an entry in the TDRA table 900, and the TDRA index may include a range of beginning at 0 and ending at (N−1), where N is the number of entries in the TDRA table 900. Optionally, in one implementation, the TDRA index may be specified in the DCI sent from the network base station and the TDRA of PUSCH is configured based on the specified entry in the TDRA table, as shown in FIG. 4B.

In one implementation, for one specified entry, a pair number of the at least one pair of start and length values is larger than one, and the TDRA of the PUSCH may be configured in a hybrid mode based on the entry in the TDRA table.

In another implementation, the pair number of the at least one pair of start and length values is equal to the number of the at least one mapping type; and the repetition number is a repetition time number for each one pair of start and length values for a transport block with corresponding mapping type. For example, for the entry 912 with the TDRA index of 1 and the repetition number of 1, the TDRA may include TB1 on 7-13 symbols of the first slot after the corresponding UL grant with the mapping type B, TB2 on 0-6 symbols of the second slot after the corresponding UL grant with the mapping type A, TB3 on 7-13 symbols of the second slot after the corresponding UL grant with the mapping type B, and TB4 on 0-6 symbols of the third slot after the corresponding UL grant with the mapping type A.

In another implementation, the pair number of the at least one pair of start and length values is not equal to the number of the at least one mapping type; and a number of transport blocks with all the corresponding mapping types at the repetition number times is equal to a number of the corresponding pair of start and length values. The repetition of transport blocks may include the following configurations. For an example when there are three transport blocks (TB1, TB2, and TB3) and repetition number is 2, a first repetition configuration may be to transmit TB1, TB2, and TB3 once, and then repeat the same transmission sequence for a second time; a second repetition configuration may include transmitting TB1 for two times consecutively, then transmitting TB2 twice consecutively, and finally transmitting TB3 twice consecutively. In one implementation, a RRC may include an indicator to specify which configuration to use. In another implementation, a DCI may include an indicator to specify which configuration to use.

Using the first repetition configuration, for example, for the entry 914 with the TDRA index of 3 and the repetition number of 2, the TDRA may include TB1 of 7-13 of the first slot after the corresponding UL grant with the mapping type B, TB2 of 0-6 of the second slot after the corresponding UL grant with the mapping type B, TB1 of 7-13 of the second slot after the corresponding UL grant with the mapping type B, and TB2 of 0-6 of the third slot after the corresponding UL grant with the mapping type B.

Using the second repetition configuration, for example, for the entry 914 with the TDRA index of 3 and the repetition number of 2, the TDRA may include TB1 of 7-13 of the first slot after the corresponding UL grant with the mapping type B, TB1 of 0-6 of the second slot after the corresponding UL grant with the mapping type B, TB2 of 7-13 of the second slot after the corresponding UL grant with the mapping type B, and TB2 of 0-6 of the third slot after the corresponding UL grant with the mapping type B.

In another implementation, for example for the entry 915 with the TDRA index of 4, the repetition number of the entry 915 is larger than one, and the pair number of start and length values of the entry 915 is equal to the number of the mapping types. Thus, for the entry 915, four TBs (TB1, TB2, TB3, and TB4) with the repetition number of 2 may be transmitted in at least two different configurations. Under the first configuration, the transmission sequence may be TB1-TB2-TB3-TB4, which is followed by TB1-TB2-TB3-TB4. Under the second configuration, the transmission sequence may be TB1-TB1-TB2-TB2-TB3-TB3-TB4-TB4.

Optionally, in one implementation, the RRC received by the user equipment may be one of a set of X and the set X may include {type I RRC, type II RRC, type III RRC}. When the type I RRC includes PUSCH-TimeDomainResourceAllocationList-ForDCIformat0_2, a PUSCH transmission mode may be in URLLC mode with the repetition number in the configured TDRA. When the type II RRC includes pusch-TimeDomainAllocationList-r16, a PUSCH transmission mode may be in the NR-U mode with multiple TTI. When the type III RRC includes pusch-TimeDomainAllocationList, a PUSCH transmission mode may be in a traditional NR mode, which may not support dynamic repetition or multiple TTIs.

Optionally, a gap of at least one symbol may exist between at least two consecutive pairs of start and length values. Referring to FIGS. 6 and 10, the TDRA table 600 may be modified to configure as a TDRA table 1000. The TDRA table 1000 may include a plurality of entries 1010. The TDRA table 1000 may include a plurality of columns, including a TDRA index 1050, a K2 1052, at least one pair of start and length values (S, L) 1054, and at least one mapping type 1056. The mapping type in 1056 may include a mapping type A and/or a mapping type B.

For example, for the entry 1012 with the TDRA index as 1, the TDRA may include TB1 on 7-12 symbols of the first slot after the corresponding UL grant with the mapping type B, TB2 on 0-5 symbols of the second slot after the corresponding UL grant with the mapping type A, TB3 on 7-12 symbols of the second slot after the corresponding UL grant with the mapping type B, and TB4 on 0-5 symbols of the third slot after the corresponding UL grant with the mapping type A. For example, a gap of at least one symbol (i.e., symbol #6) exists between the TB2 on 0-5 symbols and the TB3 on 7-12 symbols of the second slot after the corresponding UL grant.

The present disclosure describes embodiments which may decrease a waiting delay time when URLLC transmitting with NR-U frequency bands under frame based equipment (FBE) competition, and thus improving the efficiency and performance of the URLLC transmission.

In one implementation, enhanced mobile broadband (eMBB) service and URLLC service may configure different periods for FBE frame period, so as to provide URLLC service with more competition opportunity for lowering the waiting delay time. Specifically, when a user equipment (UE) uses one of either eMBB service or URLLC service, different periods may be separately configured as FBE frame period for eMBB UE and URLLC UE. When the UE uses both eMBB service and URLLC service, different periods may be configured as FBE frame periods for eMBB UE and URLLC UE, so that more than one FBE frame periods may be configured to the UE.

In another implementation, to avoid the waiting delay or lower the waiting delay time associated with URLLC service, URLLC clear channel assessment (CCA) time window may be randomized so that URLLC service may immediate begin competing for resources upon received. Specifically, a FBE competition mode may be configured for eMBB service, and a load based equipment (LBE) competition mode may be configured for URLLC service. Optionally, eMBB service may occupy non-continuous resources in time domain, so that URLLC service may compete. After the gap, eMBB service may continue transmission if the resource is idle, or may suspend transmission if the resource is busy. In another implementation, eMBB service may occupy non-continuous TTI transmission, wherein a gap of at least one symbol may exist between at least two consecutive pairs of start and length values.

The present disclosure describes methods, apparatus, and computer-readable medium for wireless communication. The present disclosure addressed the issues with configuring time domain resource allocation (TDRA) of a physical uplink shared channel (PUSCH) for a user equipment. The methods, devices, and computer-readable medium described in the present disclosure may facilitate the performance of URLLC transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising: receiving, by a user equipment, a radio resource control (RRC), the RRC configuring a time domain resource allocation (TDRA) type corresponding to a TDRA table of a channel wherein: the TDRA type comprises a type IV RRC, the TDRA table configured by the type IV RRC comprises a plurality of entries, each entry of the plurality of entries comprises a K2, at least one pair of start and length values, at least one mapping type, and a repetition number, for any entry comprising a repetition number larger than one, the entry comprises only one pair of start and length values and one mapping type, and for any entry comprising a repetition number equal to one, the entry comprises at least one pair of start and length values, at least one mapping type, wherein a pair number of the at least one pair of start and length values is equal to a number of the at least one mapping type.

2. The method according to claim 1, wherein:
the TDRA type comprises one of a set of TDRA types, wherein the set of TDRA types comprises a type I RRC, a type II RRC, and a type III RRC;
the TDRA table configured by the type I RRC comprises a plurality of entries, wherein each entry of the plurality of entries comprises a K2, a pair of start and length values, a mapping type, and a repetition number;
the TDRA table configured by the type II RRC comprises a plurality of entries, wherein each entry of the plurality of entries comprises a K2, at least one pair of start and length values, and at least one mapping type, wherein a pair number of the at least one pair of start and length values is equal to a number of the at least one mapping type; and
the TDRA table configured by the type III RRC comprises a plurality of entries, wherein each entry of the plurality of entries comprises a K2, a pair of start and length values, and a mapping type.

3. The method according to claim 2, wherein:
a gap of at least one symbol exists between at least two consecutive pairs of start and length values.

4. The method according to claim 1, wherein:
the channel comprises a physical uplink shared channel (PUSCH);
the TDRA type comprises a type V RRC;
the TDRA table configured by the type V RRC comprises a plurality of entries, wherein:
each entry of the plurality of entries comprises a K2, and a repetition number,
for any entry comprising a repetition number larger than one, the entry comprises at least one pair of start and length values and at least one mapping type.

5. The method according to claim 4, wherein:
a pair number of the at least one pair of start and length values is larger than one; and
the TDRA of the PUSCH is configured in a hybrid mode based on the entry in the TDRA table.

6. The method according to claim 5, wherein:
the pair number of the at least one pair of start and length values is equal to the number of the at least one mapping type; and
the repetition number is a repetition time number for each one pair of start and length values for a transport block with corresponding mapping type.

7. A method for wireless communication, comprising: sending, by a network base station, a radio resource control (RRC), the RRC configuring a time domain resource allocation (TDRA) type corresponding to a TDRA table of a channel, wherein: the TDRA type comprises a type IV RRC, the TDRA table configured by the type IV RRC comprises a plurality of entries, each entry of the plurality of entries comprises a K2, at least one pair of start and length values, at least one mapping type, and a repetition number, for any entry comprising a repetition number larger than one, the entry comprises only one pair of start and length values and one mapping type, and for any entry comprising a repetition number equal to one, the entry comprises at least one pair of start and length values, at least one mapping type, wherein a pair number of the at least one pair of start and length values is equal to a number of the at least one mapping type.

8. The method according to claim 7, wherein:
the TDRA type comprises one of a set of TDRA types, wherein the set of TDRA types comprises a type I RRC, a type II RRC, and a type III RRC;
the TDRA table configured by the type I RRC comprises a plurality of entries, wherein each entry of the plurality of entries comprises a K2, a pair of start and length values, a mapping type, and a repetition number;
the TDRA table configured by the type II RRC comprises a plurality of entries, wherein each entry of the plurality of entries comprises a K2, at least one pair of start and length values, and at least one mapping type, wherein a pair number of the at least one pair of start and length values is equal to a number of the at least one mapping type; and
the TDRA table configured by the type III RRC comprises a plurality of entries, wherein each entry of the plurality of entries comprises a K2, a pair of start and length values, and a mapping type.

9. The method according to claim 8, wherein:
a gap of at least one symbol exists between at least two consecutive pairs of start and length values.

10. The method according to claim 7, wherein:
the channel comprises a physical uplink shared channel (PUSCH);
the TDRA type comprises a type V RRC;
the TDRA table configured by the type V RRC comprises a plurality of entries, wherein:
each entry of the plurality of entries comprises a K2, and a repetition number,
for any entry comprising a repetition number larger than one, the entry comprises at least one pair of start and length values and at least one mapping type.

11. The method according to claim 10, wherein:
a pair number of the at least one pair of start and length values is larger than one; and
the TDRA of the PUSCH is configured in a hybrid mode based on the entry in the TDRA table.

12. The method according to claim 11, wherein:
the pair number of the at least one pair of start and length values is equal to the number of the at least one mapping type; and
the repetition number is a repetition time number for each one pair of start and length values for a transport block with corresponding mapping type.

13. An apparatus comprising: a memory storing instructions; and a processor in communication with the memory, wherein, when the processor executes the instructions, the processor is configured to cause the apparatus to perform: receiving a radio resource control (RRC), the RRC configuring a time domain resource allocation (TDRA) type corresponding to a TDRA table of a channel, wherein: the TDRA type comprises a type IV RRC, the TDRA table configured by the type IV RRC comprises a plurality of entries, each entry of the plurality of entries comprises a K2, at least one pair of start and length values, at least one mapping type, and a repetition number, for any entry comprising a repetition number larger than one, the entry comprises only one pair of start and length values and one mapping type, and for any entry comprising a repetition number equal to one, the entry comprises at least one pair of start and length values, at least one mapping type, wherein a pair number of the at least one pair of start and length values is equal to a number of the at least one mapping type.

14. An apparatus comprising:
a memory storing instructions; and
a processor in communication with the memory, wherein, when the processor executes the instructions, the processor is configured to cause the apparatus to perform the method according to claim 7.

15. A non-transitory computer-readable program medium storing instructions, wherein, the instructions, when executed by a processor, are configured to cause the processor to implement the method according to claim 1.

16. A non-transitory computer-readable program medium storing instructions, wherein, the instructions, when executed by a processor, are configured to cause the processor to implement the method according to claim 7.

* * * * *